(12) United States Patent
Hsiao

(10) Patent No.: US 9,109,100 B2
(45) Date of Patent: Aug. 18, 2015

(54) COMPOSITION FOR PREPARING ARTIFICIAL GRAPHITE ELEMENT, POWDERY MATERIAL, AND METHOD FOR FABRICATING THE ELEMENT

(71) Applicant: Ekeen Precision Co., Ltd., Hsinchu County (TW)

(72) Inventor: Chun-Hsu Hsiao, Hsinchu County (TW)

(73) Assignee: Ekeen Precision Co., Ltd., Hsin-Chu (TW)

( * ) Notice: Subject to any disclaimer, the term of this patent is extended or adjusted under 35 U.S.C. 154(b) by 123 days.

(21) Appl. No.: 13/942,665

(22) Filed: Jul. 15, 2013

(65) Prior Publication Data

US 2014/0017159 A1    Jan. 16, 2014

(30) Foreign Application Priority Data

Jul. 13, 2012 (TW) .............................. 101125259 A

(51) Int. Cl.
| | |
|---|---|
| C08K 11/00 | (2006.01) |
| C08K 5/05 | (2006.01) |
| F21V 29/00 | (2015.01) |
| C08K 3/04 | (2006.01) |

(52) U.S. Cl.
CPC .................. C08K 11/005 (2013.01); C08K 3/04 (2013.01); C08K 5/05 (2013.01); *Y10T 428/2982* (2015.01)

(58) Field of Classification Search
CPC .......... C08K 11/005; C08K 3/04; C08K 5/05; F21V 29/24; C08L 95/00; C08L 61/60; C01B 31/04; C01B 31/0407; C01B 31/0415; C01B 2204/00; C01B 2204/02; C01B 2204/04; C01B 2204/06; C01B 2204/065; C01B 2204/20; C01B 2204/22; C01B 2204/24; C01B 2204/28; C01B 2204/30; C01B 2204/32
USPC .......... 502/416–438; 264/29.1–29.7; 423/448
See application file for complete search history.

(56) References Cited

U.S. PATENT DOCUMENTS

| | | | | |
|---|---|---|---|---|
| 3,585,155 | A | * | 6/1971 | Hollstein .................... 106/284.3 |
| 3,830,776 | A | * | 8/1974 | Carlson et al. ................. 523/218 |
| 2006/0106152 | A1 | * | 5/2006 | Metzinger et al. ............ 524/495 |

FOREIGN PATENT DOCUMENTS

| | | |
|---|---|---|
| TW | I307145 B1 | 3/2009 |
| TW | 201114684 A1 | 5/2011 |

* cited by examiner

*Primary Examiner* — Daniel C McCracken

(57) ABSTRACT

A composition for producing an artificial graphite element and a method for producing the same are provided. The composition includes a carbon-containing raw material such as fly ash, an adhesive, and a dispersant. The method for producing the artificial graphite element of the present invention includes the steps of mixing the above composition; baking the mixed composition to obtain powder having a plurality of particles; screening the powder to select particles having suitable particle diameters; molding the plurality of screened particles into an article; heating the article at 500 to 1000° C.; and graphitizing the heated article to obtain the artificial graphite element. The method of the present invention is simple and cost-effective. The artificial graphite element produced has a considerably large specific surface area due to its porous property, such that it is suitable for use as a heat-dissipating substrate.

10 Claims, No Drawings

COMPOSITION FOR PREPARING ARTIFICIAL GRAPHITE ELEMENT, POWDERY MATERIAL, AND METHOD FOR FABRICATING THE ELEMENT

FIELD OF THE INVENTION

The present invention relates to compositions for preparing artificial graphite elements and methods for fabricating the elements, and relates particularly to a composition containing fly ash and a method for preparing an artificial graphite element by using the composition.

BACKGROUND OF RELATED ART

For energy saving and carbon reduction, it is gradually the tend to inhibit the uses of incandescent light bulbs with high power consumption and progress to make full use of LED lighting fixtures with advantages of low powder consumption, power-saving, long service time and durability. However, current LED lighting fixtures are limited by the good thermal conductivity and slow heat-dissipating speed of the traditional aluminous heat-dissipating materials used. As a result, the products capable of replacing the traditional light fixtures are yet to be launched.

Moreover, as electronic products become increasingly slimmer and lighter in development, power consumption increases. If heat is not dissipated immediately when a hot spot is generated by a microscale thermal fluid during the operation of a chip, the chip cannot exhibit better performance or the consumption of the chip is increased such that the life time is lowered and the overall quality and performance are affected. Conventionally, heat dissipation on a circuit board usually involves the use of an aluminous heat-dissipating material. However, although the aluminous heat-dissipating material has a higher coefficient of thermal conductivity, its coefficient of heat dissipation is lower. As such, the aluminous heat-dissipating material has a poor heat-dissipating effect, thereby generating a thermal bottleneck.

Furthermore, thermal energy can be transferred by three approaches—conduction, convection and radiation. Solid heat-dissipating materials are mainly selected from materials with high coefficients of thermal conductivity, and dissipate heat by convection with air. Thus, the effect of heat dissipation is closely associated with the surface area of the material itself. Conventionally, heat-dissipating materials are made into spirally heat-dissipating sheets, heat-dissipating fins, spirally heat-dissipating fins, and the like, to increase the surface area for contacting air. The electronic industry gradually switches to use natural graphite, which has a loosely-packed structure and properties like lightness, high thermal conductivity and high heat dissipation, as a heat-dissipating material. However, natural graphite is not only expensive, but also bulky as compared with the volume of the conventional heat-dissipating fins. This makes natural graphite unsuitable for use in electronic products that are slimmer and lighter or LEDs. Therefore, a need still exists to research and develop heat-dissipating materials with better heat-dissipating effects.

Currently, in order to develop a suitable heat-dissipating material, TW Patent No. I307145 discloses a heat dissipater made from carbon composite containing diamond particles, an aluminum base and graphite, which can achieve good effects of thermal conduction and heat dissipation. However, the diamond particles and the aluminum base need graphite to achieve a good sealing effect with aluminum. In addition, diamonds are costly, and difficult to be processed due to a high degree of hardness. Mass production of the heat dissipater by the electronic industry is not economic.

TW Patent Application Publication No. 201114684 discloses a method for forming a powdery material and a porous material having the properties of graphite from unburned carbon. In this method, carbon-containing fly ash needs to be collected, and subjected to acid wash for purification, grinding, mixing, pressing, sintering, and secondary processing after cooling to form the graphite material. The processing steps are miscellaneous, and acid wash or alkaline wash is needed during purification. Further, the purified product needs to be grinded to 50 millimeters or lower for the mixing and pressing steps. After sintering, the product has poor planarity, as it contains metal oxides. Therefore, cutting or grinding is needed as the secondary processing for surface planarity. The process steps are too miscellaneous, and waste fluid generated by acid wash also harms the environment.

Accordingly, it is a critical issue to develop a heat-dissipating element with a simple production process and a high heat-dissipating ability, so as to resolve the issue of heat dissipation at hot spots of a heating article.

SUMMARY OF THE INVENTION

The present invention provides a composition for preparing an articial graphite element, including: carbon-containing raw materials in an amount of 50 to 60%, based on the total weight of the composition; an adhesive in an amount of 15 to 45%, based on the total weight of the composition; and a dispersant in an amount of 5 to 25%, based on the total weight of the composition. The composition of the present invention contains an adhesive for the carbon-containing raw materials to be combined by closely stacking, so as to achieve desired rigidity and hardness. The composition of the present invention further contains a dispersant, which can effectively disperse the adhesive during the production of the artificial graphite element. Particularly, in an embodiment where a viscous adhesive is used, the presence of the dispersant is sufficient to allow the adhesive to uniformly combine the powdery particles, so as to avoid agglomeration of a single ingredient. Thus, the specific surface area of the artificial graphite element can be increased.

The present invention further discloses a method for preparing an artificial graphite element, including the steps of: mixing the above composition; baking the mixed composition at 80 to 200° C. for 1 to 3 hours, to obtain powder containing a plurality of particles; screening the powder to select particles each having a particle diameter size ranging from 100 to 1000 micrometers; molding the selected particles to form an article; heating the article at 500 to 1000° C. for 1 to 3 hours; and graphitizing the heated article at 1900 to 2500° C. for 1 to 5 hours to obtain the artificial graphite element.

In the method of the present invention, the carbon-containing raw materials, adhesive and dispersant are thoroughly mixed, then baked to remove the dispersant to allow the adhesive to surround the carbon-containing raw materials and allow the carbon-containing raw materials of the molded article to be closely aligned by the adhesive, and then heated to remove the adhesive from the article to form voids at the positions where the adhesive is present, and the heated article is graphitized to obtain a porous artificial graphite element.

The present invention further provides a powdery material for producing an artificial graphite element, including a plurality of particles each having a particle diameter size ranging from 100 to 1000 microns. Each of the particles contains a mixture of a carbon-containing raw material and an adhesive.

The method for producing an artificial graphite element of the present invention needs only the fly ash consisting of coal fly ash and fuel oil fly ash, which are generated without complicated processing procedures. The porous artificial graphite element not only can solve the heat-dissipating problems arisen from high luminous flux of an LED lighting fixture and high power of a chip by its porosity, but also can be directly attached to substrate without a secondary processing. The artificial graphite element is extremely convenient for applications.

DETAILED DESCRIPTION OF THE PREFERRED EMBODIMENTS

In the following, specific embodiments are provided to illustrate the detailed description of the present invention. Those skilled in the art can easily conceive the other advantages and effects of the present invention, based on the disclosure of the specification. The present invention can also be practiced or applied by referring to the other different embodiments. Each of the details in the specification can also be modified or altered in various ways in view of different aspects and applications, without departing from the spirit of the disclosure of the present invention.

The artificial graphite element of the present invention is mainly applied in an electronic product or a lamp having high heat-dissipating requirements. Aluminum or copper are mainly used conventionally in the industry as a heat-dissipating material. Because copper and aluminum both have good conductivity but slower heat-dissipating speed, the heat-dissipating materials are mainly made into spirally heat-dissipating sheets, heat-dissipating fins, and spirally heat-dissipating fins, and the like, to increase the surface areas of the heat-dissipating materials for contacting with air. However, the extent that the heat-dissipating efficiency is increased is limited by the heat-dissipating materials.

The present invention provides a composition for preparing an artificial graphite element, including carbon-containing raw materials, an adhesive and a dispersant. In a preferable example, the carbon-containing materials are in an amount ranging from 50 to 60%, and preferably from 54 to 56%, based on the total weight of the composition; and an adhesive is in an amount ranging from 15 to 45%, and preferably from 35 to 40%, based on the total weight of the composition; and a dispersant is in an amount ranging from 5 to 25%, and preferably from 5 to 10%, based on the total weight of the composition.

The carbon-containing materials of the composition of the present invention includes fly ash. In an embodiment, the carbon-containing materials include fly ash and graphite powder, wherein the fly ash is in an amount of 85 to 95%, and the graphite powder is in an amount ranging from 5 to 15%, based on the total weight of the carbon-containing materials. In a more preferable example, the fly ash in the carbon-containing raw materials is in an amount ranging from 90 to 95%, and the graphite is in an amount ranging from 5 to 10%. In an embodiment, the graphite powder may play the role of a mold release agent.

In the composition of the present invention, the adhesive includes, but is not limited to, asphalt, a polymer or a combination thereof. In an embodiment, the asphalt used includes, but is not limited to, tar pitch, petroleum pitch or natural asphalt. The polymer used includes, but is not limited to, synthetic resins, natural resins, aqueous resins or a combination thereof. For example, the polymer may be polyurethane, epoxy resin, novolac resins, poly(methyl methacrylate), polyurethane resins or combinations thereof, and the novolac resin polymers are preferable.

In a composition of the present invention, the dispersant used includes, but is not limited to, water, an alcohol compound or a combination thereof. In an embodiment, the dispersant used includes, but is not limited to, a saturated alcohols, unsaturated alcohols, alicyclic alcohols or mixtures thereof. In a preferred embodiment, an alcohol compound having boiling points lower than that of water is used, so as to facilitate the subsequent removal. Thus, ethanol can be used.

The present invention further provides a method for producing an artificial graphite element. The method mixes the mixture of the above artificial graphite element in a mixing tank, bakes the mixed composition to remove the dispersant, and even the possibly present solvent, from the mixed composition to obtain powder having a plurality of particles, screens the powder to select particles each having a particle diameter size ranging from 100 to 1000 microns, molds the selected particles into an article, heats the article to remove the adhesive, and graphitizes the article without the adhesive to obtain the artificial graphite element.

In the method of the present invention, after the composition is thoroughly mixed, the mixed composition is baked at 80 to 200° C. for 1 to 3 hours, to obtain a plurality of particles. Particles each having a particle diameter size ranging from 100 to 1000 micrometers are selected by screening, and subjected to suitable molding to allow the particles to be more closely stacked. It is found in the present invention that if the particle diameter is greater than 1000 micrometers, the voids among the particles causes heat not to be effectively transferred; and if the particle diameter is less than 100 micrometers, the molded article is partially stuck in the gap between the molds, which even causes the molded article to crack. That is, the particle diameter size is preferably from 150 to 500 micrometers, and more preferably from 250 to 500 micrometers.

Accordingly, the present invention further provides a powdery material for producing an artificial graphite element, including a plurality of particles each having particle diameter size ranging from 100 to 1000 micrometers. Further, each of the particles is a mixture of carbon-containing raw materials and an adhesive. The thus-obtained artificial graphite element has a surface with desired planarity, and can be used as a heat-dissipating material for a chip or an electric circuit board by being directly pressed on a substrate.

After obtaining the powdery material, the plurality of the particles screened are molded by hot pressing or powder metallurgy, preferably molded at a pressure of 20 tons to 50 tons by powder metallurgy to be molded into an article; and the article is heated at 500 to 1000° C., preferably at 600 to 800° C. for 1 to 3 hours to remove the solvent; and the article is graphitized without the adhesive at 1900 to 2500° C. for 1 to 5 hours to obtain the artificial graphite element. For example, graphitization is performed at 1900 to 2300° C. for 3 to 5 hours. For example, graphitization is performed at 2300 to 2500° C. for 1 to 3 hours.

The steps in the method of the present invention are simple, and the obtained artificial graphite element has a high coefficient of heat dissipation. Further, molding by powder metallurgy only requires a one-time filling, is cost-effective and results in good planarity.

The following specific examples further illustrates the detailed description of the present invention. A person skilled in the art can conceive the other advantages and effects of the present invention from the disclosure of the specification of present invention. The examples of the present invention are shown below, but the present invention is not limited to the examples.

An electronic gravimeter with a model no. MH-300C was used to measure the wet density and porosity of the artificial graphite element of the present invention.

EXAMPLE 1

95 g of fuel fly ash, 5 g of natural graphite powder, 50 g of a novolac resin of

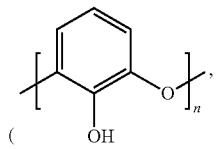

formula (I)

wherein n is an integer ranging from 500 to 1000) and 30 g of ethanol were thoroughly mixed in a mixing tank, and then the mixture was baked at 80° C. for 2 hours to remove thanol. Then, a Tyler sieve with an inner diameter Φ210×H45 mm and an oscillator (model no. LS-450A) were used to perform screening for selection, so as to obtain a plurality of particles having particle diameter sizes ranging from 150 to 500. Immediately after, the plurality of particles were pressed at a pressure condition of 40 tons to be molded into an article, by using a powder metallurgic molding machine (model no. PT-60). Then, under nitrogen, the article was heated at 700° C. for 2 hours to remove the novolac resin. Then, the article was graphitized at 2500° C. for 3 hours in a vacuum graphitization furnace (model no. JR-350) under argon. After cooling, the artificial graphite element was obtained. The wet density and porosity of the artificial graphite element were measured by using the electronic gravimeter, and the results are shown in Table 1.

EXAMPLE 2

90 g of fuel fly ash, 10 g of natural graphite powder, 50 g of the novolac resin of formula (I) and 30 g of ethanol were thoroughly mixed in a mixing tank, and then the mixture was baked at 80° C. for 2 hours to remove thanol. Then, a Tyler sieve with an inner diameter Φ 210×H45 mm and an oscillator (model no. LS-450A) were used to perform screening for selection, so as to obtain a plurality of particles having particle diameter sizes ranging from 150 to 500. Immediately after, the plurality of particles were pressed at a pressure condition of 40 tons to be molded into an article, by using a powder metallurgic molding machine (model no. PT-60). Then, under nitrogen, the article was heated at 700° C. for 2 hours to remove the novolac resin. Then, the article was graphitized at 2500° C. for 3 hours in a vacuum graphitization furnace (model no. JR-350) under argon. After cooling, the artificial graphite element was obtained. The wet density and porosity of the artificial graphite element were measured by using the electronic gravimeter, and the results are shown in Table 1.

EXAMPLE 3

The steps in Example 1 were repeated, except that 100 g of fuel fly ash, 55 g of the novolac resin of formula (I) and 30 g of ethanol were used for mixing in this example. Further, in this example, no natural graphite was added.

TABLE 1

|  | Example1 | Example 2 | Example 3 |
| --- | --- | --- | --- |
| Wet density | 1.500 | 1.506 | 1.544 |
| Porosity | 34.427 | 30.416 | 36.501 |

Test Example 1

Substrates having an LED chip with a luminous flux of 240 lumens (lm) disposed thereon were placed on the artificial graphite lamp cups with a specification of MR 16 as produced from Examples 1, 2 and 3. The thermocouple of a handgrip thermocouple temperature sensor was engaged with the pins of the positive electrode of the LED substrate and the outer edge of the artificial graphite lamp cup, so as to measure the temperatures inside and outside the substrate and heat-dissipating element when the chip operates. The artificial graphite lamp cup was immobilized to a rack, and an electric current was constantly outputted by using a power supply (model no. DP-3003N), which was in the constant current power supply mode. The voltages, electric currents and temperature values of the light source of the LEDs reaching thermal equilibrium after about 1 hour were recorded.

transparent acrylic case with a volume of 80 liters encloses a rack engaged with the artificial graphite lamp cup, the thermocouple handgrip temperature sensor and the power supply, so as to avoid the influence of the test results by air flow. The temperatures inside and outside of the acrylic case were measured, and the measured temperatures were recorded in Table 2.

Test Example 2

The steps in test example 1 were repeated, except that the artificial graphite lamp cups of the present invention were replaced with aluminum lamp cups having the same appearance. The measured temperatures were recorded in Table 2.

TABLE 2

|  | Temperature of the pin of the positive electrode | Temperature of the lamp cup | Temperature inside the case | Temperature outside the case | Electric current (A) | Voltage (V) |
| --- | --- | --- | --- | --- | --- | --- |
| Test example 2 | 78.4 | 59.3 | 24.4 | 22.5 | 0.87 | 6.3 |
| Example 1 | 74.5° C. | 52.1° C. | 24.5° C. | 23.8° C. | 0.87 | 6.3 |
| Example 2 | 73.7 | 53.4 | 24.8 | 24 | 0.87 | 6.3 |
| Example 3 | 75.6 | 51.3 | 24.6 | 23.8 | 0.87 | 6.3 |

As shown from the above results, the artificial graphite element produced by the method and composition of the present invention have better heat-dissipating ability than the aluminum lamp cups. Moreover, the method of the present invention does not need the steps of acid washing, grinding, and the like, thereby substantially simplifying the process steps in the method. Further, if power metallurgy was used for molding, molding can be rapid. In addition, the present invention further provides a powdery material suitable for use in molding by powder metallurgy, and the artificial graphite element produced further has a better planarity. The artificial graphite element can be used as a heat-dissipating material by being directly pressed on a substrate, and has broader applications and higher convenience.

The above examples are only used to illustrate the principle of the present invention and the effect thereof, and should not be construed as to limit the present invention. The above examples can all be modified and altered by those skilled in the art, without departing from the spirit and scope of the present invention as defined in the following appended claims.

The invention claimed is:

1. A composition for producing an artificial graphite element, comprising:
   a carbon-containing raw material comprising fly ash and graphite powder, and being in an amount ranging from 50 to 60%, based on a total weight of the composition;
   an adhesive in an amount ranging from 15 to 45%, based on the total weight of the composition; and
   a dispersant in an amount ranging from 5 to 25%, based on the total weight of the composition; and
   the fly ash being in an amount ranging from 85 to 95%, and the graphite powder being in an amount ranging from 5 to 15%, based on a total weight of the carbon-containing raw material.

2. The composition of claim 1, wherein the fly ash is selected from the group consisting of coal fly ash, fuel oil fly ash and a combination thereof.

3. The composition of claim 1, wherein the adhesive is selected from the group consisting of an asphalt and a polymer.

4. The composition of claim 3, wherein the polymer is selected from the group consisting of novolac resin polymers.

5. The composition of claim 1, wherein the dispersant is an aqueous dispersant.

6. The composition of claim 5, wherein the aqueous dispersant is selected from the group consisting of water, an alcohol compound and a combination thereof.

7. The composition of claim 6, wherein the aqueous dispersant is ethanol.

8. A method for preparing an artificial graphite element, comprising:
   providing the composition of claim 1;
   baking the composition at 80 to 200° C. for 1 to 3 hours, so as to obtain powder;
   screening the powder to select particles each having a particle diameter size ranging from 100 to 1000 microns;
   molding the selected particles into an article;
   heating the article at 500 to 1000° C. for 1 to 3 hours to form a heated article; and
   graphitizing the heated article at 1900 to 2500° C. for 1 to 5 hours, so as to obtain the artificial graphite element.

9. The method of claim 8, wherein each of the selected particles has a particle diameter size ranging from 100 to 500 micrometers.

10. The method of claim 8, wherein the selected particles are molded by one of heat pressing and powder metallurgy.

* * * * *